(12) United States Patent
Jeong

(10) Patent No.: US 9,530,998 B2
(45) Date of Patent: Dec. 27, 2016

(54) HIGH VOLTAGE BATTERY FOR VEHICLE

(71) Applicant: Hyundai Motor Company, Seoul (KR)

(72) Inventor: Yeon Man Jeong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 120 days.

(21) Appl. No.: 14/454,412

(22) Filed: Aug. 7, 2014

(65) Prior Publication Data

US 2015/0171399 A1 Jun. 18, 2015

(30) Foreign Application Priority Data

Dec. 18, 2013 (KR) ........................ 10-2013-0157737

(51) Int. Cl.
| | |
|---|---|
| *H01M 2/20* | (2006.01) |
| *H01M 2/18* | (2006.01) |
| *H01M 2/10* | (2006.01) |
| *H01M 2/34* | (2006.01) |

(52) U.S. Cl.
CPC ............. *H01M 2/18* (2013.01); *H01M 2/1077* (2013.01); *H01M 2/206* (2013.01); *H01M 2/345* (2013.01); *H01M 2220/20* (2013.01)

(58) Field of Classification Search
CPC .................................................. H01M 2/206
See application file for complete search history.

(56) References Cited

U.S. PATENT DOCUMENTS

| | | | |
|---|---|---|---|
| 7,118,827 B2 | 10/2006 | Kruger et al. | |
| 2005/0089751 A1* | 4/2005 | Oogami | H01M 2/1061 |
| | | | 429/162 |
| 2012/0135295 A1* | 5/2012 | Kim | H01M 2/1061 |
| | | | 429/159 |
| 2013/0323549 A1* | 12/2013 | Choi | H01M 2/30 |
| | | | 429/62 |

FOREIGN PATENT DOCUMENTS

| | | |
|---|---|---|
| JP | 2006-196222 A | 7/2006 |
| KR | 10-2012-0005727 A | 1/2012 |
| KR | 10-2012-0086656 A | 8/2012 |
| KR | 10-2013-0035244 A | 4/2013 |
| KR | 10-2013-0059301 A | 6/2013 |
| KR | 10-2013-0069472 A | 6/2013 |

* cited by examiner

*Primary Examiner* — Carlos Barcena
*Assistant Examiner* — Wojciech Haske
(74) *Attorney, Agent, or Firm* — McDermott Will & Emery LLP

(57) ABSTRACT

A high voltage battery for a vehicle includes a first plate, a second plate, and a third plate coupled to be folded with each other and have cell insertion spaces formed therebetween. A bus bar includes a first lead which is inserted into a side boundary of the first plate and the second plate to contact a tab of a cell, a second lead which is inserted into a side boundary of the second plate and the third plate to contact a tab of another cell, and a connector which connects the lead to the second lead.

8 Claims, 3 Drawing Sheets

HIGH VOLTAGE BATTERY FOR VEHICLE

CROSS REFERENCE TO RELATED APPLICATION

The present application claims the benefit of priority to Korean Patent Application Number 10-2013-0157737 filed on Dec. 18, 2013, the entire contents of which application is incorporated herein for all purposes by this reference.

TECHNICAL FIELD

The present disclosure relates to a high voltage battery for a vehicle to be able to simplify an assembling process, reduce the number of components, and assemble all cells having various shapes using the same process.

BACKGROUND

A high voltage battery for a vehicle according to the related art has several problems. Since cell lead parts are welded by a laser beam, a conducting resistance of a current is instable, and it is difficult to manage a micro gap. Due to the occurrence of a peripheral micro gap at the time of a welding defect, it is necessary to secure a dedicated jig space required during a welding process. A size of a battery module is increased due to security of an unnecessary module space for welding. A physically blocking structure using a cell swelling is complicated due to the complexity and risk of a current blocking structure, and a risk of fire such as explosion and short is raised due to a reaction delay to the swelling.

In the case of the related art, an assembling process is complicated due to the excessive number of components, a separate cell sensing structure is required, and thus, a sensing structure connection of an electrode is complicated. Further, it is not easy to differentiate whether a welding point between cells is good during the manufacturing process and an increase in line facility investment due to changing a cell kind to cope with a battery capacity for each vehicle model.

The matters described as the related art have been provided only for assisting in the understanding for the background of the present disclosure and should not be considered as corresponding to the related art known to those skilled in the art.

SUMMARY

The present disclosure provides a high voltage battery for a vehicle to be able to simplify an assembling process, reduce the number of components, and assemble all cells having various shapes using the same process.

According to an exemplary embodiment of the present disclosure, a high voltage battery for a vehicle includes a first plate, a second plate, and a third plate coupled to be folded with each other and have cell insertion spaces formed therebetween. A bus bar includes a first lead which is inserted into a side boundary of the first plate and the second plate to contact a tab of a cell, a second lead which is inserted into a side boundary of the second plate and the third plate to contact a tab of another cell, and a connector which connects the first lead to the second lead.

The first plate, the second plate, and the third plate may be folded with each other while edges thereof adhering to each other.

The connector may adhere to sides of the first plate, the second plate, and the third plate.

Each of the first lead and the second lead may include a pair of electrodes which adhere to each other and a receiver which is opened at an upper end of an electrode to receive the tab of the cell.

Each of the first lead and the second lead may be provided with terminals which connect lower ends of the adhering electrodes to the connector, and a connection point of the terminal and the connector may be provided with a cutting groove to fracture the terminal and the connector based on the cutting groove at the time of cell expansion.

The high voltage battery for a vehicle may further include a clip having both ends locked to the sides of adjacent plates to connect the respective plates to each other.

According to another exemplary embodiment of the present disclosure, a high voltage battery for a vehicle includes a first plate, a second plate, and a third plate coupled to be folded with each other and have cell insertion spaces formed therebetween. A bus bar includes a first lead which is inserted into a side boundary of the first plate and the second plate to contact a tab of a cell, a second lead which is inserted into a side boundary of the second plate and the third plate to contact a tab of another cell, and a connector which connects the first lead to the second lead. Joining bars are crossed in a thickness direction in the state in which the respective plates are folded with each other. A presser is configured to press the respective plates in a compressing direction in the state in which the joining bars are crossed.

The high voltage battery for a vehicle may further include a base plate and a finishing plate coupled with outsides of the first plate and the third plate, wherein the joining bars may have both ends connected to the base plate and the finishing plate, and the presser may have elasticity and press the finishing plate to the base plate.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, exemplary embodiments of the present disclosure will be described with reference to the accompanying drawings.

Figure 1:
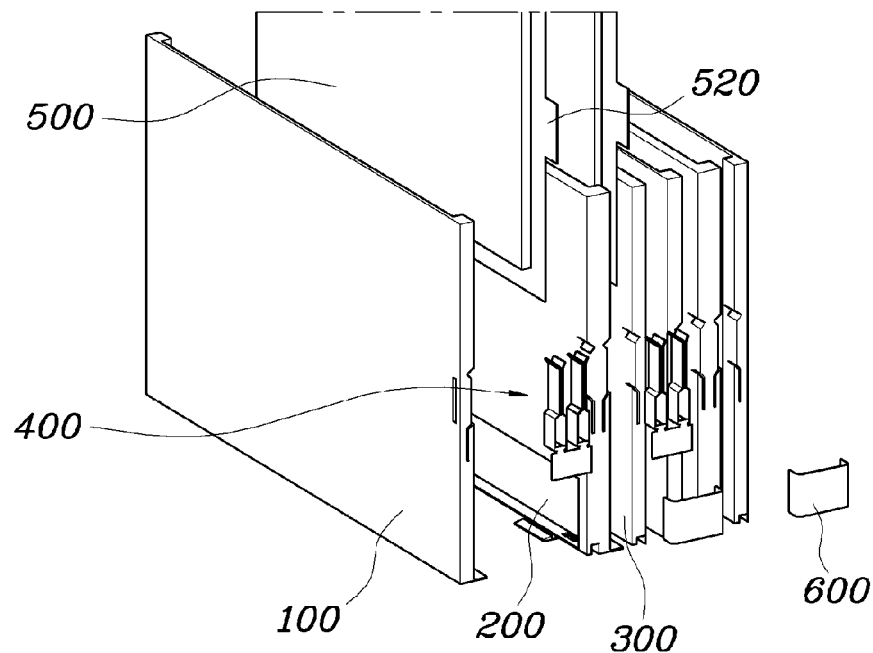
FIG. 1 is an exploded perspective view of a high voltage battery for a vehicle according to an exemplary embodiment of the present disclosure.
Figure 2:
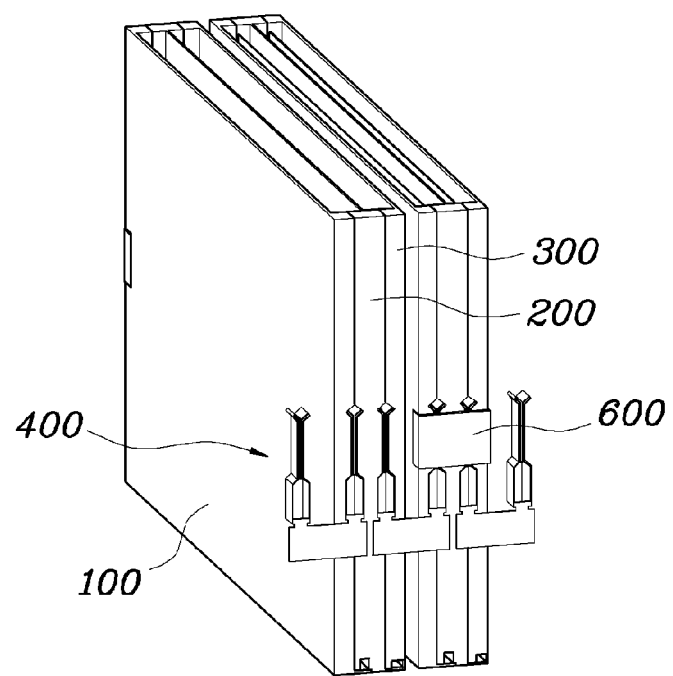
FIG. 2 is a coupled perspective view of a high voltage battery for a vehicle according to an exemplary embodiment of the present disclosure.
Figure 3:
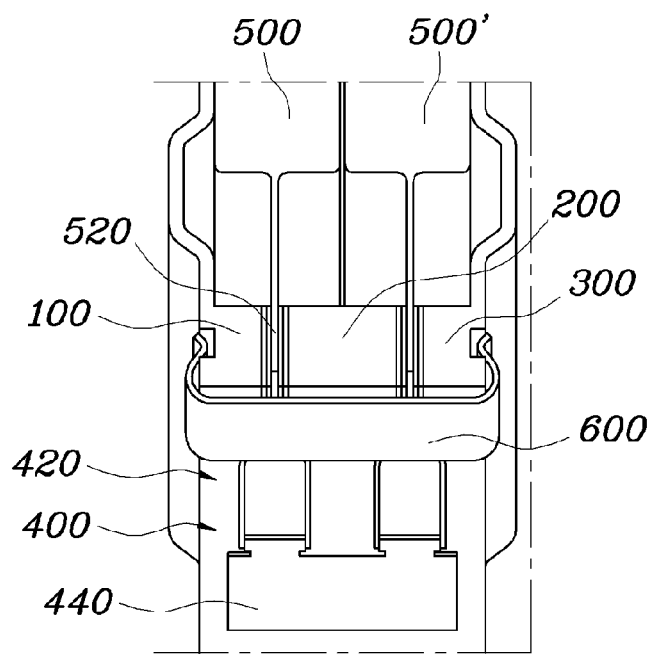
FIGS. 3 and 4 are enlarged views of a high voltage battery for a vehicle according to an exemplary embodiment of the present disclosure.
Figure 4:
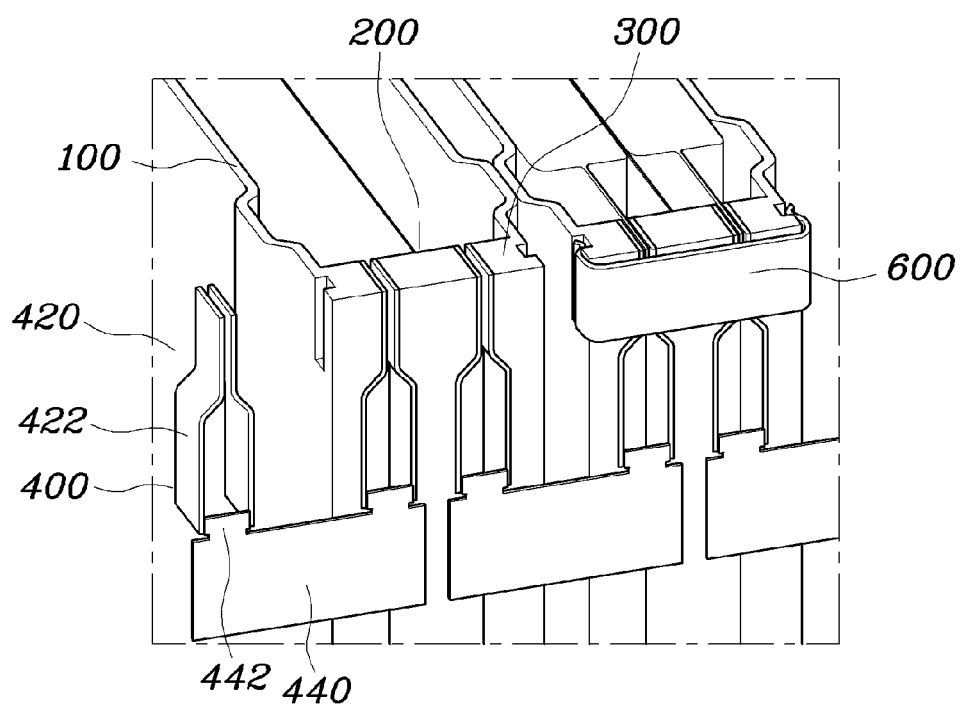
Figure 5:
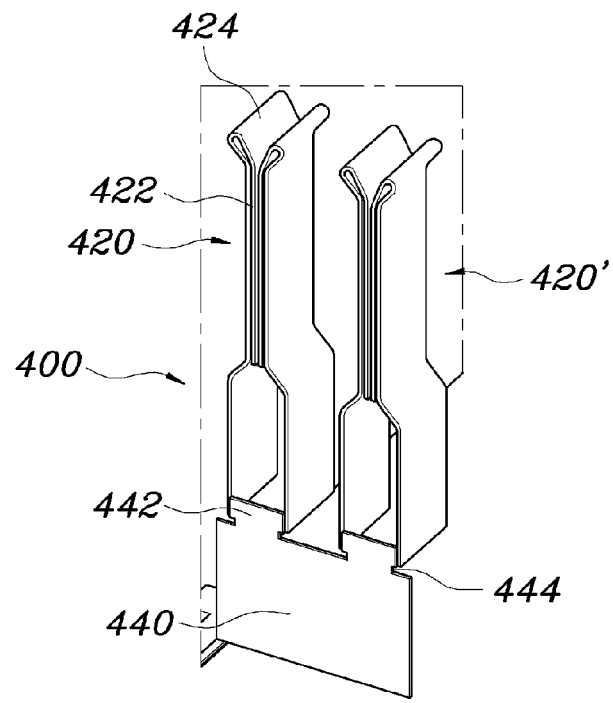
FIG. 5 is a diagram illustrating a bus bar of a high voltage battery for a vehicle according to an exemplary embodiment of the present disclosure.
Figure 6:
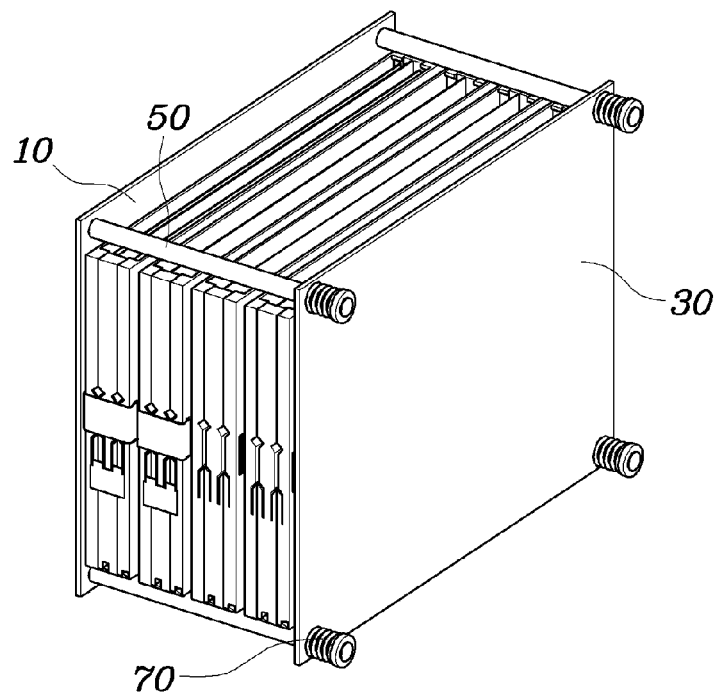
FIG. 6 is a coupled perspective view of a high voltage battery for a vehicle according to another exemplary embodiment of the present disclosure.

FIG. 1 is an exploded perspective view of a high voltage battery for a vehicle according to an exemplary embodiment of the present disclosure. FIG. 2 is a coupled perspective view of the high voltage battery for a vehicle according to an exemplary embodiment of the present disclosure. FIGS. 3 and 4 are enlarged views of the high voltage battery for a vehicle according to an exemplary embodiment of the present disclosure. FIG. 5 is a diagram illustrating a bus bar of the high voltage battery for a vehicle according to an exemplary embodiment of the present disclosure. FIG. 6 is a coupled perspective view of a high voltage battery for a vehicle according to another exemplary embodiment of the present disclosure.

A high voltage battery for a vehicle according to an exemplary embodiment of the present disclosure includes a first plate 100, a second plate 200, and a third plate 300 which are coupled to be folded with each other and have cell insertion spaces formed therebetween. A bus bar 400 includes a first lead 420 which is inserted into a side boundary of the first plate 100 and the second plate 200 to contact a tab 520 of a cell 500, a second lead 420' which is inserted into a side boundary of the second plate 200 and the third plate 300 to contact a tab of another cell, and a connector 440 which connects the first lead 420 to the second lead 420'.

As illustrated in FIGS. 1 to 4, the high voltage battery according to an exemplary embodiment of the present disclosure is configured of a plurality of plates, in which each of the plates overlaps each other. The first plate 100, the second plate 200, and the third plate 300 are illustrated as an example.

Each of the plates is folded with each other. A cell insertion space is formed between the folded plates and is assembled by a method of inserting the battery cell 500 into a space formed between the respective plates.

As illustrated in FIG. 5, the bus bar 400 includes the first lead 420, the second lead 420', and the connector 440. The first lead 420 is inserted into the side boundary of the first plate 100 and the second plate 200. The first lead 420 contacts the tab 520 of the inserted cell 500. The second lead 420' is inserted into the side boundary of the second plate 200 and the third plate 300 to contact a tab of another cell. Further, the connector 440 connects the first lead 420 to the second lead 420'.

That is, the respective plates overlap each other, and the bus bar 400 is inserted between the plates. In this state, when the cells 500 are inserted, the tab 520 protruding laterally of the cell 500 contacts each of the leads. The first lead 420 and the second lead 420' are connected to each other by the connector 440 at the outside, such that the respective cells 500 may be connected to each other in series. The first plate 100, the second plate 200, and the third plate 300 may be folded while edges thereof adhering to each other. A space into which the cell is inserted is formed between the first plate 100, the second plate 200, and the third plate 300. The connector 440 may adhere to sides of the first plate 100, the second plate 200, and the third plate 300. That is, the connector 440 is bent at a right angle in the state in which the lead is inserted, and thus adheres to the sides of the plates.

In detail, the first lead 420 and the second lead 420' may each include a pair of electrodes 422 which adhere to each other and a receiver 424 which is opened at an upper end of an electrode 422 to receive the tab 520 of the cell 500. The tab 520 of the cell 500 is inserted between the electrodes 422 stably forming the lead through the receiver 424, and thus contacts the electrodes 422.

The first lead 420 and the second lead 420' are each provided with terminals 442 which connect lower ends of the adhering electrodes 422 to the connector 440. A connection point of a terminal 442 and the connection part 440 is provided with a cutting groove 444 to fracture the terminal 442 and the connector 440 based on the cutting groove 444 at the time of a cell expansion. As a result, a circuit of the battery may be simply cut off at the time of swelling without having a separate swelling preventing sensor or the like.

The high voltage battery may further include a clip 600 having both ends locked to the sides of adjacent plates to connect the respective plates to each other.

Further, as illustrated in FIG. 6, a high voltage battery for a vehicle according to another embodiment of the present disclosure includes a first plate 100, a second plate 200, and a third plate 300 which are coupled to be folded with each other and have cell insertion spaces formed therebetween. A bus bar 400 includes a first lead 420 which is inserted into a side boundary of the first plate 100 and the second plate 200 to contact a tab 520 of a cell, a second lead 420' which is inserted into a side boundary of the second plate 200 and the third plate 300 to contact a tab of another cell, and a connector 440 connecting the first lead 420 to the second lead 420'. Joining bars 50 are crossed in a thickness direction in the state in which the respective plates are folded with each other. A presser 70 presses the respective plates in a compressing direction in the state in which the joining bars 50 are crossed.

The high voltage battery further includes a base plate 10 and a finishing plate 30 which are coupled with outsides of the first plate 100 and the third plate 300. The joining bar 50 has both ends connected to the base plate 10 and the finishing plate 30, and the presser 70 has elasticity and may press the finishing plate 30 to the base plate 10. That is, the respective plates overlap each other and are joined with each other by inserting the bus bar 400 therebetween. Thereafter, the cells 500 are inserted into each space of the respective plates, and thus simply connected to each other in series. A welding process is unnecessary.

The base plate 10 and the finishing plate 30 are disposed at both sides and are restricted by the joining bars 50 which cross the respective plates. The end of the joining bar 50 is provided with a spring, and thus, the presser 70 compresses the base plate 10 and the finishing plate 30.

According to the high voltage battery for a vehicle having the structure as described above, it is possible to simplify the assembling process, reduce the number of components, and assemble all the cells having various shapes with the same processes. Further, it is possible to pre-block a current by more sensitively reacting to the cell swelling and prevent the explosion, the short, and the like due to a reaction of the cell itself.

There is no need to weld the lead according to the structure of applying a surface pressure to the cell module. Thus, it is possible to overcome a conducting resistance of the cell lead by maximizing a contact area and improve assembling performance and save the cost by omitting the welding process and reducing the number of components. Further, it is possible to improve problems of the overall vibration and shock of the battery module and improve volume energy density of the module by eliminating the jig space for welding in the existing module.

In addition, a fractural structure due to the cell swelling need not have a separate cell sensing structure, and it is possible to fluidly cope with the overall battery capacity for each vehicle model by reflecting a variable cell structure of two packs or more due to the removal of necessity of welding, such that the single cell may be mass-produced and the compatibility may be maximized, thereby contributing to the price cutting and the improvement in productivity.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A high voltage battery for a vehicle, comprising:
   a first plate, a second plate, and a third plate coupled to have cell insertion spaces formed therebetween; and
   a bus bar including a first lead which is inserted into a side boundary of the first plate and the second plate to contact a tab of a cell, a second lead which is inserted into a side boundary of the second plate and the third plate to contact a tab of another cell, and a connector which connects the first lead to the second lead.

2. The high voltage battery for a vehicle of claim 1, wherein the first plate, the second plate, and the third plate are folded with each other while edges thereof adhering to each other.

3. The high voltage battery for a vehicle of claim 1, wherein the connector adheres to sides of the first plate, the second plate, and the third plate.

4. The high voltage battery for a vehicle of claim 1, wherein each of the first lead and the second lead includes a pair of electrodes which adhere to each other and a receiver which is opened at an upper end of the electrodes to receive the tab of the cell.

5. The high voltage battery for a vehicle of claim 1, wherein each of the first lead and the second lead is provided with terminals which connect lower ends of the adhering electrodes to the connector and a connection point of the terminals and the connector is provided with a cutting groove to fracture the terminals and the connector based on the cutting groove at the time of the expansion of the cell.

6. The high voltage battery for a vehicle of claim 1, further comprising:
   a clip having both ends locked to sides of adjacent plates to connect the respective plates to each other.

7. first plate, a second plate, and a third plate coupled to have cell insertion spaces formed therebetween;
   a bus bar including a first lead which is inserted into a side boundary of the first plate and the second plate to contact a tab of a cell, a second lead which is inserted into a side boundary of the second plate and the third plate to contact a tab of another cell, and a connector which connects the first lead to the second lead;
   joining bars configured to be crossed in a thickness direction in the state in which the respective plates are folded with each other; and
   a presser configured to press the respective plates in a compressing direction in the state in which the joining bars are crossed.

8. The high voltage battery for a vehicle of claim 7, further comprising:
   a base plate and a finishing plate coupled with outsides of the first plate and the third plate, wherein the joining bar has both ends connected to the base plate and the finishing plate, and the presser has elasticity and presses the finishing plate to the base plate.

* * * * *